(12) United States Patent
Suto et al.

(10) Patent No.: US 10,576,976 B2
(45) Date of Patent: Mar. 3, 2020

(54) DRIVABLE AREA SETTING DEVICE AND DRIVABLE AREA SETTING METHOD

(71) Applicant: HONDA MOTOR CO., LTD., Tokyo (JP)

(72) Inventors: Shuichi Suto, Tokyo (JP); Hitoshi Konishi, Wako (JP); Daichi Kato, Wako (JP); Chihiro Abe, Wako (JP); Shion Tokunaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 204 days.

(21) Appl. No.: 15/787,892

(22) Filed: Oct. 19, 2017

(65) Prior Publication Data
US 2018/0148052 A1    May 31, 2018

(30) Foreign Application Priority Data

Nov. 29, 2016    (JP) .................................. 2016-231445

(51) Int. Cl.
*B60W 30/12* (2006.01)
*B60W 30/18* (2012.01)
*B60W 40/06* (2012.01)
*G01C 21/36* (2006.01)
*G05D 1/02* (2006.01)

(52) U.S. Cl.
CPC ...... *B60W 30/12* (2013.01); *B60W 30/18145* (2013.01); *B60W 30/18154* (2013.01); *B60W 40/06* (2013.01); *G01C 21/3658* (2013.01); *G05D 1/0274* (2013.01); *G05D 2201/0213* (2013.01)

(58) Field of Classification Search
CPC combination set(s) only.
See application file for complete search history.

(56) References Cited

U.S. PATENT DOCUMENTS

| | | | |
|---|---|---|---|
| 2004/0193347 A1* | 9/2004 | Harumoto | ........... B60R 21/0132 701/45 |
| 2010/0295668 A1* | 11/2010 | Kataoka | ............... B62D 15/025 340/435 |
| 2016/0339959 A1* | 11/2016 | Lee | ..................... B62D 15/0265 |
| 2017/0350720 A1* | 12/2017 | Turner | ............... G01C 21/3691 |

FOREIGN PATENT DOCUMENTS

| | | |
|---|---|---|
| JP | 2006-273230 | 10/2006 |
| JP | 2010-026326 | 2/2010 |

* cited by examiner

*Primary Examiner* — Rami Khatib
(74) *Attorney, Agent, or Firm* — Rankin, Hill & Clark LLP

(57) ABSTRACT

A drivable area setting device and a drivable area setting method, which can perform driving control based on a drivable area also in a road section in which a lane marker is not present. A terminal node specifying unit specifies a terminal node of a lane marker on an entry side and a terminal node of a lane marker on an exit side in a road section, such as an intersection, in which lane marker data are not present, a virtual lane marker generating unit for generating a virtual lane marker linking the terminal node of the lane marker on the entry side to the terminal node of the lane marker on the exit side, and an area setting unit for setting, as a drivable area of a vehicle, an area interposed between the generated virtual lane markers.

5 Claims, 3 Drawing Sheets

DRIVABLE AREA SETTING DEVICE AND DRIVABLE AREA SETTING METHOD

FIELD OF THE INVENTION

The present invention relates to a drivable area setting device and a drivable area setting method, and more particularly, is suitably used for a device for setting a drivable area over a road of a guiding route in an automated driving car in which steering is automatically controlled along the guiding route.

BACKGROUND OF THE INVENTION

In recent years, an automated driving car capable of automatically driving without human operation has been developed vigorously. The automated driving car automatically controls steering of a vehicle so as to drive along a guiding route generated in advance. The guiding route in this case is generated by using lane network data (data defining connection property of lanes on a road), for example. In the case in which the guiding route is generated by using the lane network data, a vehicle is controlled in such a manner that a vehicle position to be detected by using a GPS receiver or the like is moved along a position of a lane network.

There are known the techniques for generating a guiding route in an intersection to perform driving control of a vehicle (see Japanese Laid-Open Patent Publications Nos. 2006-273230 and 2010-26326, for example). The Japanese Laid-Open Patent Publication No. 2006-273230 describes that a driving track in a guiding intersection to be guided through a route guidance is predicted based on an entry lane and an exit lane in the guiding intersection and vehicle control is performed based on the driving track.

The Japanese Laid-Open Patent Publication No. 2010-26326 describes that in-intersection lane data indicative of an in-intersection lane for a combination of an entry point and an exit point of an intersection is generated in accordance with an intersection database having at least one combination of accessible entry points and exit points, the in-intersection lane thus generated is connected to the entry and exit lanes of the intersection to generate a vehicle guiding route for guiding a vehicle.

SUMMARY OF THE INVENTION

When performing automated driving, in a road section in which a lane marker is present, it is possible to decide an area between lane markers of a lane as a drivable area, thereby performing driving control. For example, it is possible to control driving so as not to cause a vehicle to deviate from the lane marker while controlling the vehicle driving based on a guiding route generated by using lane network data.

In general, however, a lane marker of a lane is not present in an intersection. For this reason, it is impossible to perform the driving control based on a drivable area. There is the same problem in road sections other than the intersection where the lane marker is not present.

The Japanese Laid-Open Patent Publications Nos. 2006-273230 and 2010-26326 provide a technique for generating a guiding route in an intersection to perform driving control. A guiding route to be generated is data on a driving track indicated by a single line. Therefore, it is impossible to perform driving control based on a drivable area in an intersection even if the techniques described in Japanese Laid-Open Patent Publications Nos. 2006-273230 and 2010-26326 are used.

The present invention has been made to solve the problem and has an object to enable execution of driving control based on a drivable area also in a road section where a lane marker is not present.

In order to attain the object, the present invention serves to generate virtual lane markers linking terminal nodes of lane markers on an entry side to terminal nodes of lane markers on an exit side in a road section where there are no lane marker data indicative of a position in which a lane marker of a lane is present and to set an area interposed between the generated virtual lane markers as a drivable area of a vehicle.

According to the present invention having the structure described above, the virtual lane markers are generated for the road section having no lane marker and the area interposed between the virtual lane markers is set as the drivable area even if the road section has no lane marker. Therefore, it is possible to perform driving control based on the drivable area.

DETAILED DESCRIPTION OF PREFERRED EMBODIMENT

Figure 1:
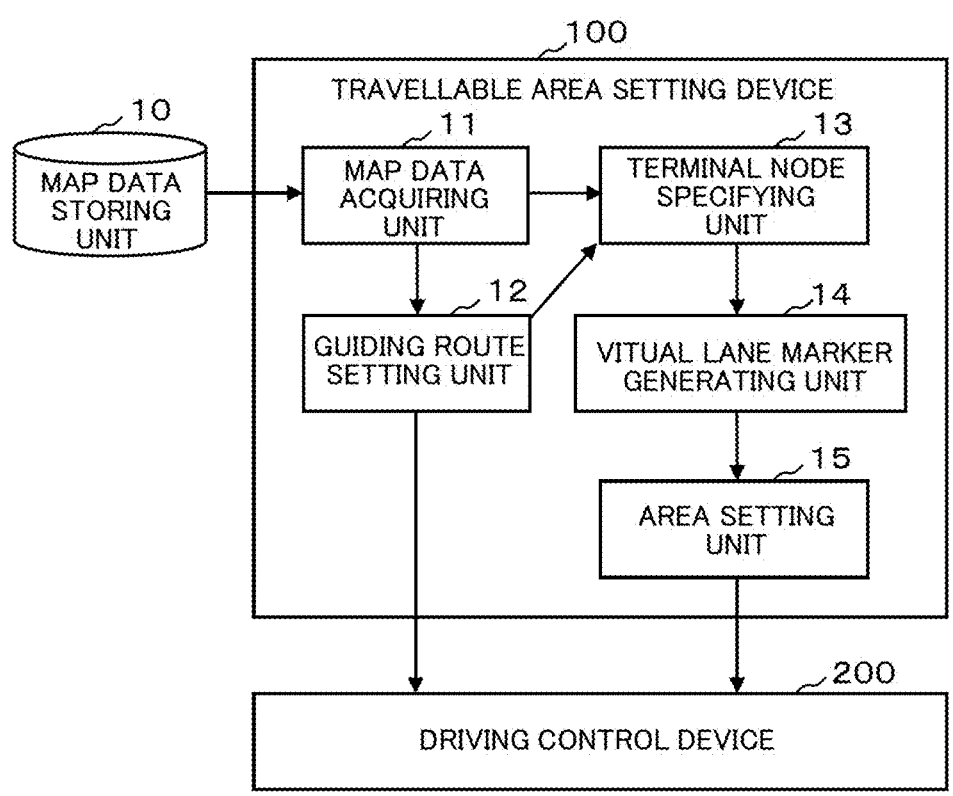
FIG. 1 is a block diagram showing an example of a functional structure of a drivable area setting device according to the present embodiment.

An embodiment of the present invention will be described with reference to the drawings. FIG. 1 is a block diagram showing an example of a functional structure of a drivable area setting device according to the present embodiment. The drivable area setting device according to the present embodiment is applied to an automated driving car in which steering is controlled automatically along a guiding route without a human steering operation and serves to set a drivable area on a road of the guiding route.

As shown in FIG. 1, a drivable area setting device 100 according to the present embodiment includes, as functional structures thereof, a map data acquiring unit 11, a guiding route setting unit 12, a terminal node specifying unit 13, a virtual lane marker generating unit 14, and an area setting unit 15. These functional blocks 11 to 15 can be configured from any of hardware, DSP (Digital Signal Processor) and software. For example, in the case in which the functional blocks 11 to 15 are configured from the software, they actually include a CPU, an RAM, an ROM and the like in a computer and are implemented by an operation of a program stored in a recording medium such as the RAM, the ROM, a hard disk or a semiconductor memory.

The map data acquiring unit 11 acquires map data from a map data storing unit 10. The map data include lane marker data indicative of a position in which a lane marker of a lane is present and lane network data defining connection property of lanes. The map data storing unit 10 may be included in an in-vehicle device or an external server which is accessible via internet.

Lane marker data are constituted by node data representing a discrete position set onto a lane marker of a road and link data representing a straight line or a curved line which connects the nodes. The lane network data define, as line data, an intermediate position interposed between two lane markers and are constituted by node data and link data in the same manner as the lane marker data. In the intersection, the lane network data are constituted by a plurality of constituting points representing a shape of a straight line or a curved line and links connecting the respective constituting points, for example. The lane marker data are not present in a road section having no lane marker (which will be hereinafter referred to as a lane marker non-presence section). On the other hand, the lane network data are also present in the lane marker non-presence section. Thus, the connection property of the lane is defined. An example of the lane marker non-presence section includes an intersection.

The guiding route setting unit 12 sets a guiding route connecting a current position to a destination by using the map data acquired by the map data acquiring unit 11 and stores data on the guiding route thus set. For example, the guiding route setting unit 12 searches a guiding route connecting a current position acquired by a current position acquiring device (not shown) to a destination set by a user and taking the smallest cost and stores data on the guiding route thus searched in the same manner as a route searching function possessed by a navigation device. The data on the guiding route are lane marker data and lane network data which are present along the guiding route, for example.

In the present embodiment, it is assumed that a guiding route on a lane unit specifying which lane to be used for driving is set if there is a plurality of lanes on a road. In other words, data on the guiding route thus set are constituted by lane marker data representing lane markers on both sides of the lane for driving and lane network data which are present in a position interposed between the lane markers on the both sides. However, only the lane network data are included in the lane marker non-presence section.

The terminal node specifying unit 13 specifies a terminal node of a lane marker on an entry side and a terminal node of a lane marker on an exit side in a lane marker non-presence section in which the lane network data are present and the lane marker data are not present over the guiding route set by the guiding route setting unit 12 based on the map data acquired by the map data acquiring unit 11.

In the case in which a plurality of lanes is present on a road at the entry side and a road at the exit side which are to be connected to the lane marker non-presence section and a lane for entry and a lane for exit are specified by the lane network data since a guiding route is set on a lane unit as in the present embodiment, the terminal node specifying unit 13 specifies a terminal node of a lane marker of a lane specified on the entry side of the lane marker non-presence section and a terminal node of a lane marker of a lane specified on the exit side thereof.

Figure 2:
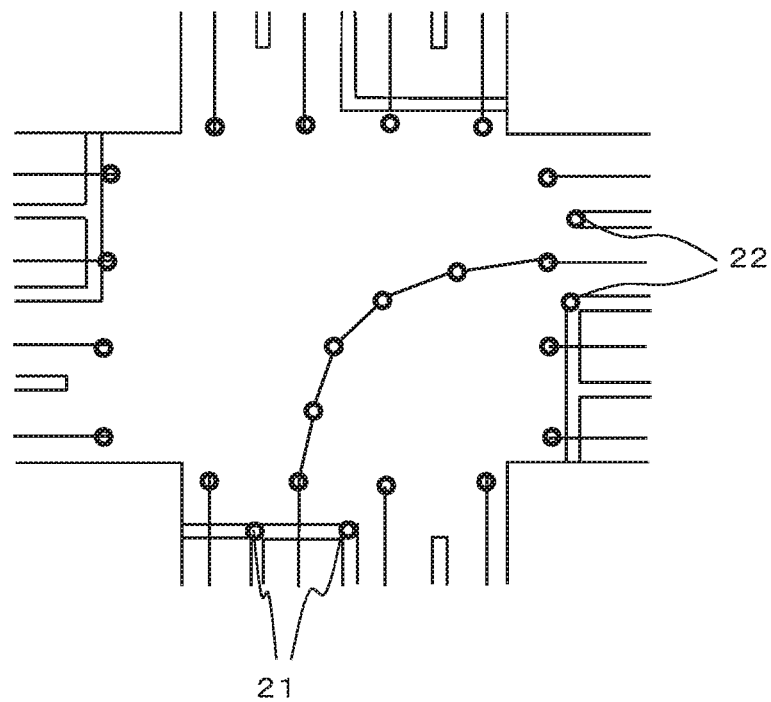
FIG. 2 is a view showing an example of a terminal node to be specified by a terminal node specifying unit according to the present embodiment.

FIG. 2 is a view showing an example of a terminal node to be specified by the terminal node specifying unit 13. As shown in FIG. 2, if the lane marker non-presence section is an intersection, for example, the terminal node specifying unit 13 specifies a last terminal node 21 of a lane marker defining a guiding lane on an entry road for an intersection and a first terminal node 22 of a lane marker defining a guiding lane on an exit road from the intersection.

The virtual lane marker generating unit 14 generates virtual lane markers connecting the terminal node 21 of the lane marker on the entry side and the terminal node 22 of the lane marker on the exit side at both sides of a lane network indicated by the lane network data in conformity with a track of the lane network.

Figure 3:
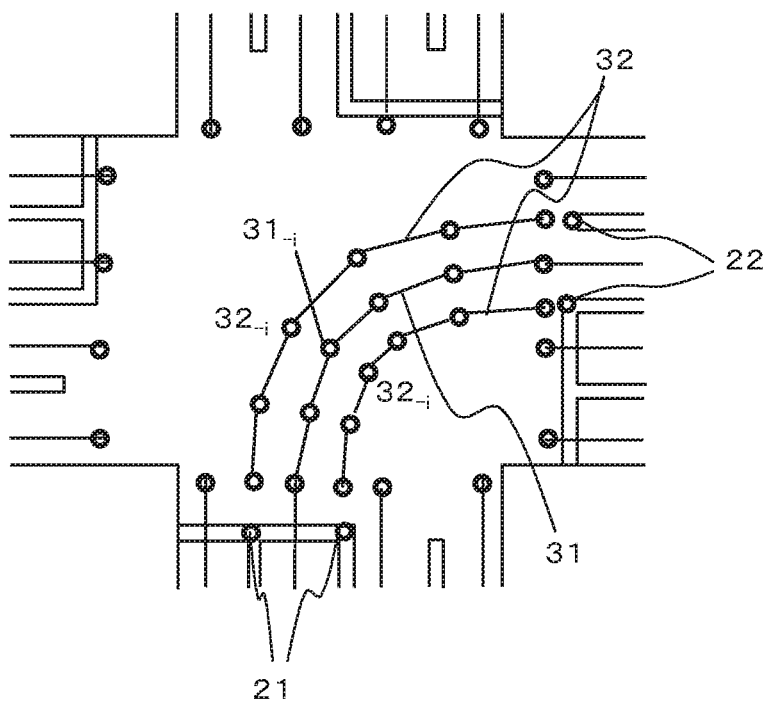
FIG. 3 is a view for explaining processing contents through a virtual lane marker generating unit according to the present embodiment.

FIG. 3 is a view for explaining processing contents through the virtual lane marker generating unit 14. FIG. 3 shows an example in which a curved shape of an in-intersection link is stored on a plurality of constituting points $31_{-i}$ (i=1 to n. n represents the number of constituting points present in the lane marker non-presence section). A portion between the continuous constituting points $31_{-i}$ and $31_{-i+1}$ is represented by a straight line.

As shown in FIG. 3, the virtual lane marker generating unit 14 sets respective constituting points $32_{-i}$ of the virtual lane marker in a perpendicular direction to a tracking direction of the lane network 31 at both sides of each constituting point $31_{-i}$ of the lane network 31 present in the lane marker non-presence section with respect to the constituting points $31_{-i}$ and connects the respective constituting points $32_{-i}$ of the virtual lane marker through a straight line, thereby generating a virtual lane marker 32. At this time, if widths of the lane markers are equal to each other at the entry and exit sides, the constituting points $32_{-i}$ of the virtual lane marker 32 to be set to both sides of the constituting points $31_{-i}$ of the lane network 31 are set to a position at an equal distance from each constituting point $31_{-i}$ of the lane network 31 at both sides. On the other hand, if the widths of the lane markers are not equal to each other at the entry and exit sides, a distance to give a proportional division is calculated from a ratio of the width on the entry side to that on the exit side and a position of each constituting point $31_{-i}$ in an intersection to set a position of each constituting point $32_{-i}$ of the virtual lane marker 32.

There are some map data in which the curved shape of the in-intersection link is expressed in a curved line (for example, a B spline curve). In this case, the virtual lane markers 32 at both sides of the lane network 32 can also be generated by a curved line (for example, a B spline curve).

For example, if the widths of the lane markers are equal to each other at the entry and exit sides, the virtual lane marker generating unit 14 moves a curved line representing the lane network 31 in parallel to interpolate excess and deficiency portions from the terminal node 21 of the lane marker on the entry side and from the terminal node 22 of the lane marker on the exit side, thereby enabling the virtual lane marker 32 to be generated. On the other hand, if the widths of the lane markers are not equal to each other at the entry side and the exit side, the virtual lane marker generating unit 14 may set a plurality of constituting points between the terminal node 21 on the entry side and the terminal node 22 on the exit side to connect them with a straight line, thereby generating the virtual lane marker 32, for example. Alternatively, the virtual lane marker 32 linking the terminal node 21 on the entry side and the terminal node 22 on the exit side may be generated by a curved line having a predetermined curvature or a curved line formed with a predetermined function. The predetermined curvature may have a uniform fixed value on any intersection or a value which is predetermined depending on a size of the intersection and a distinction of right or left turn, for example.

In the case in which the shape of the lane network data present in the lane marker non-presence section is expressed with a predetermined function, moreover, the virtual lane marker 32 may be generated based on the same function as the lane network data.

The area setting unit 15 sets, as a vehicle drivable area, an area interposed between the virtual lane markers 32 generated by the virtual lane marker generating unit 14. For convenience of explanation, there has been described the example in which a drivable area is set to a single intersection. In the case in which a plurality of lane marker non-presence sections is present on a guiding route from a current place to a destination, each drivable area is set to each lane marker non-presence section.

Herein, various embodiments can be applied to a timing for setting the drivable area. For example, when the guiding route is set by the guiding route setting unit 12, the drivable areas can be set to all of the lane marker non-presence sections on the guiding route. Alternatively, it is also possible to set a drivable area to the nearest lane marker non-presence section every time a vehicle reaches a point on this side at a predetermined distance of the lane marker non-presence section.

A driving control device 200 automatically controls steering based on the lane network data in the guiding route set by the guiding route setting unit 12 and data on a drivable area to be specified by the lane marker data in a road section in which the lane marker data are present and a drivable area set to the lane marker non-presence section by the area setting unit 15, thereby controlling a vehicle to perform automated driving along the guiding route. For example, the driving control device 200 controls steering to perform driving along the track of the lane network data, and furthermore, controls the steering to cause the vehicle to drive in the drivable area when the vehicle deviates or might deviate from the drivable area.

Figure 4:
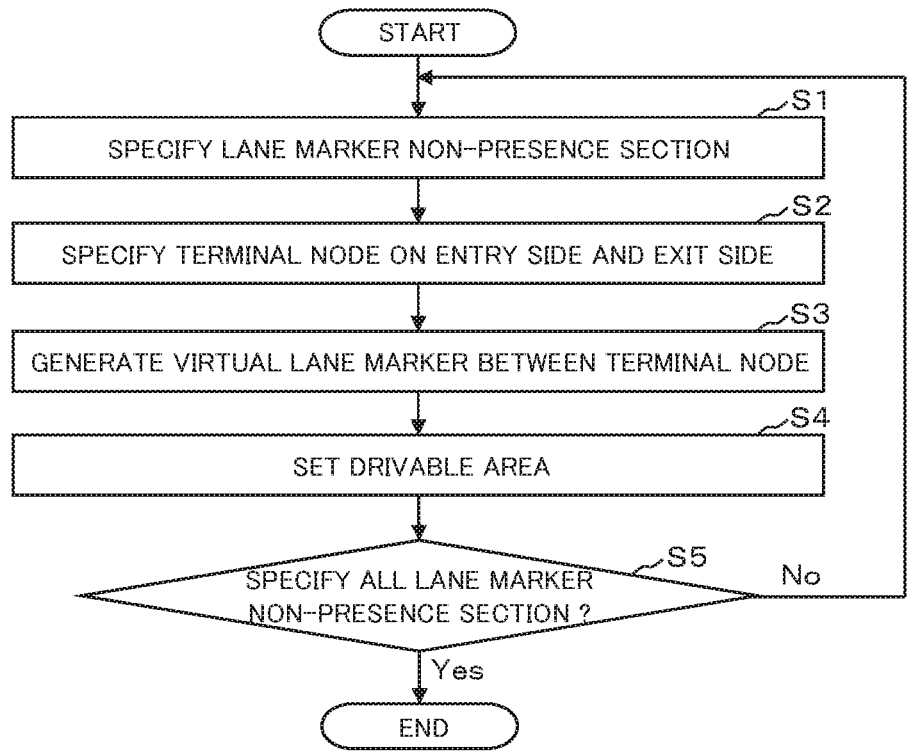
FIG. 4 is a flowchart showing an example of an operation of the drivable area setting device according to the present embodiment.

FIG. 4 is a flowchart showing an example of an operation of the drivable area setting device 100 according to the present embodiment having the structure described above. The flowchart shown in FIG. 4 is started when the guiding route is set by the guiding route setting unit 12 and an instruction for automated driving using the driving control device 200 is given.

First of all, the terminal node specifying unit 13 specifies a lane marker non-presence section which is present on a guiding route (Step S1). For example, the terminal node specifying unit 13 specifies a lane marker non-presence section which is present in the closest position to the current position. Then, the terminal node specifying unit 13 specifies the terminal node 21 of the lane marker on the entry side and the terminal node 22 of the lane marker on the exit side in the lane marker non-presence section based on the map data acquired by the map data acquiring unit 11 with respect to the lane marker non-presence section which is specified (Step S2).

Next, the virtual lane marker generating unit 14 generates a virtual lane marker 32 connecting the terminal node 21 of the lane marker on the entry side and the terminal node 22 of the lane marker on the exit side which are specified by the terminal node specifying unit 13 (Step S3). Subsequently, the area setting unit 15 sets, as a drivable area of a vehicle, an area interposed between the virtual lane markers generated by the virtual lane marker generating unit 14 (Step S4).

Then, it is decided whether all of the lane marker non-presence sections in the guiding route are completely specified or not (Step S5). If there is any lane marker non-presence section which has not been specified yet, the processing returns to the Step S1. In this case, the terminal node specifying unit 13 specifies a next lane marker non-presence section which is closer to a destination side. On the other hand, if all of the lane marker non-presence sections in the guiding route are completely specified, the processing of the flowchart shown in FIG. 4 is ended.

As described above in detail, in the present embodiment, the virtual lane marker 32 linking the terminal node 21 of the lane marker on the entry side and the terminal node 22 of the lane marker on the exit side is generated in the lane marker non-presence section on the guiding route set to perform the automated driving and the area interposed between the generated virtual lane markers 32 is set as the drivable area of the vehicle.

According to the present embodiment having the structure described above, the virtual lane marker 32 is generated for the lane marker non-presence section and the area interposed between the virtual lane markers 32 is set as the drivable area even if the lane marker non-presence section has no lane marker. Consequently, the driving control device 200 can perform driving control based on the drivable area in addition to the lane network.

Although the description has been given to the example in which the driving control device 200 performs the steering control by using both the lane network and the drivable area through the lane marker or the virtual lane marker in the embodiment, it is possible to apply the drivable area setting device 100 according to the present embodiment also when the driving control device 200 performs the steering control by using only the drivable area. In this case, the map data do not need to always include the lane network data but may include only the lane marker data.

In the case in which the lane network data are not present, the virtual lane marker generating unit 14 cannot perform processing for setting he virtual lane marker 32 along a track of a lane network. In this case, the virtual lane marker generating unit 14 generates the virtual lane marker 32 linking the terminal node 21 of the lane marker on the entry side to the terminal node 22 of the lane marker on the exit side by a curved line having a predetermined curvature or a curved line formed with a predetermined function, for example. The predetermined curvature may have a uniform fixed value also in any intersection or a value which is predetermined depending on a size of the intersection and a distinction of right or left turn, for example.

Although the description has been given to the example of the case in which the guiding route setting unit 12 sets the guiding route on a lane unit in the embodiment, moreover, it is also possible to apply the drivable area setting device 100 to the case in which the guiding route is set on a road unit. In this case, however, there is a possibility that which lane to be used for the driving of the vehicle might be varied depending on a road situation, a driving situation or the like at that time. Every time the vehicle reaches a point on this side at a predetermined distance from the lane marker non-presence section, therefore, the drivable area is set to the nearest lane marker non-presence section.

Figure 5:
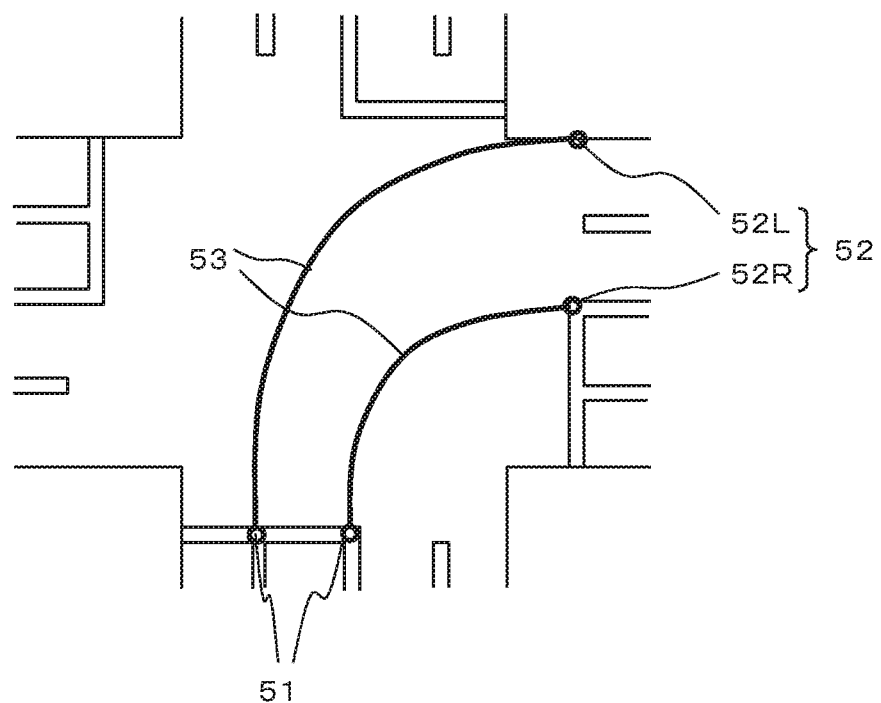
FIG. 5 is a view for explaining a variant of processing contents through the terminal node specifying unit and the virtual lane marker generating unit according to the present embodiment.

Herein, the terminal node specifying unit 13 specifies a terminal node 51 of a lane marker defining a driving lane on the entry side of the lane marker non-presence section and a terminal node 52 of an outermost lane marker of a road on the exit side as shown in FIG. 5. In the case in which a plurality of lanes is present on the road at the exit side, for example, a terminal node 52L of a lane marker at a left side in a leftmost lane and a terminal node 52R of a lane marker on a right side in a rightmost lane are specified as two terminal nodes related to the road on the exit side.

As described above, if the lanes are present on the road at the exit side, the virtual lane marker generating unit 14 generates a virtual lane marker 53 to have a width increased gradually from the entry side toward the exit side in the lane marker non-presence section. At this time, the virtual lane marker generating unit 14 generates the virtual lane marker 53 linking the terminal node 51 of the lane marker on the entry side to the terminal node 52 of the lane marker on the exit side by the curved line having the predetermined curvature or the curved line formed with the predetermined function. Alternatively, it is also possible to generate the virtual lane marker 53 by setting a plurality of constituting points between the terminal node 51 on the entry side and the terminal node 52 on the exit side and connecting the respective constituting points through a straight line.

In addition, the embodiment is only illustrative for concreteness to carry out the present invention and the technical scope of the present invention should not be thereby construed to be restrictive. In other words, the present invention can be carried out in various configurations without departing from the gist or main features thereof.

The invention claimed is:

1. A drivable area setting device comprising:
 a map data acquiring unit for acquiring map data including lane marker data indicative of a position in which a lane marker of a lane is present;
 a terminal node specifying unit for specifying a terminal node of a lane marker on an entry side and a terminal node of a lane marker on an exit side in a road section in which the lane marker data are not present in the road section based on the map data acquired by the map data acquiring unit;
 a virtual lane marker generating unit for generating two virtual lane markers not intersecting each other and linking the terminal node of the lane marker on the entry side to the terminal node of the lane marker on the exit side; and
 an area setting unit for setting, as a drivable area of a vehicle, an area interposed between the two virtual lane markers generated by the virtual lane marker generating unit, wherein
 the map data include lane network data defining connection property of the lanes in addition to the lane marker data,
 the terminal node specifying unit specifies the terminal node of the lane marker on the entry side and the terminal node of the lane marker on the exit side in a road section in which the lane network data are present and the lane marker data are not present based on the map data acquired by the map data acquiring unit, and
 the virtual lane marker generating unit generates the virtual lane marker linking the terminal node of the lane marker on the entry side to the terminal node of the lane marker on the exit side at both sides of a lane network indicated by the lane network data in conformity with a track of the lane network.

2. The drivable area setting device according to claim 1, wherein the virtual lane marker generating unit sets constituting points of the virtual lane marker to each of constituting points representing a curved shape of the lane network data present in the road section in a perpendicular direction to a tracking direction of the lane network at both sides of the constituting points representing the curved shape and connects the constituting points of the virtual lane marker through a straight line, thereby generating the virtual lane marker.

3. The drivable area setting device according to claim 1, wherein when a plurality of lanes is present on at least one of a road on the entry side and a road on the exit side which are to be connected to the road section and an entry lane and an exit lane are specified by the lane network data, the terminal node specifying unit specifies a terminal node of a lane marker of a lane specified at the entry side and a terminal node of a lane marker of a lane specified at the exit side in the road section.

4. The drivable area setting device according to claim 2, wherein when a plurality of lanes is present on at least one of a road on the entry side and a road on the exit side which are to be connected to the road section and an entry lane and an exit lane are specified by the lane network data, the terminal node specifying unit specifies a terminal node of a lane marker of a lane specified at the entry side and a terminal node of a lane marker of a lane specified at the exit side in the road section.

5. A drivable area setting method for setting a drivable area for automated driving in a computer provided on a vehicle, the method comprising:
 specifying via a terminal node specifying unit of the computer a terminal node of a lane marker on an entry side and a terminal node of a lane marker on an exit side in a road section in which lane marker data indicative of a position in which a lane marker of a lane is present are not present based on map data including the lane marker data;
 generating via a virtual lane marker generating unit of the computer two virtual lane markers not intersecting each other and linking the terminal node of the lane marker on the entry side to the terminal node of the lane marker on the exit side; and
 setting via an area setting unit of the computer an area interposed between the two virtual lane markers as a drivable area of the vehicle,
 wherein the method further includes:
 defining connection property of the lanes in addition to the lane marker data,
 specifying via the terminal node specifying unit the terminal node of the lane marker on the entry side and the terminal node of the lane marker on the exit side in a road section in which the lane network data are present and the lane marker data are not present based on the map data acquired by the map data acquiring unit, and
 generating via the virtual lane marker generating unit the virtual lane marker linking the terminal node of the lane marker on the entry side to the terminal node of the lane marker on the exit side at both sides of a lane network indicated by the lane network data in conformity with a track of the lane network.

* * * * *